United States Patent [19]
Riggs

[11] 3,765,247
[45] Oct. 16, 1973

[54] AIR SAMPLING DEVICE
[75] Inventor: R. Kent Riggs, Owensboro, Ky.
[73] Assignee: National-Southwire Aluminum Company, Carrollton, Ga.
[22] Filed: Oct. 22, 1971
[21] Appl. No.: 191,690

[52] U.S. Cl. ............................ 73/421.5 R, 23/254 R
[51] Int. Cl. ............................ G01n 1/24, G01n 1/26
[58] Field of Search .......................... 73/28, 421.5 R; 23/254 R; 417/151

[56] References Cited
UNITED STATES PATENTS
| 1,395,560 | 11/1921 | Lany et al. | 23/254 R |
| 1,719,864 | 7/1929 | Zimmerman | 23/254 R |
| 2,128,170 | 8/1938 | Stull | 417/151 |
| 2,955,025 | 10/1960 | Conlon | 23/259 |

FOREIGN PATENTS OR APPLICATIONS
703,079   1/1954   Great Britain ................. 73/421.5 R Primary Examiner—S. Clement Swisher
Attorney—Van C. Wilks et al.

[57] ABSTRACT

This disclosure relates to an air sampling device operated solely by compressed air which is conducted through a venturi tube thereby creating a region of reduced pressure for drawing ambient air into the device where particles or gases carried therein are trapped in a filter type device for analysis. The device includes a manifold having a plurality of fittings each adapted to receive individual sample-collecting chambers whereby several samples may be taken consecutively.

7 Claims, 4 Drawing Figures

PATENTED OCT 16 1973

INVENTOR
R. KENT RIGGS

BY Van C. Wilks
H. M. Hanigan
ATTORNEYS

AIR SAMPLING DEVICE

This invention relates generally to the aluminum reduction industry, and more particularly to a device for obtaining samples of air in an aluminum reduction plant in order to determine the amount of dust and other particles carried therein.

In aluminum reduction plants, as well as in manufacturing plants generally, it is necessary to sample the ambient air to test for dust or other foreign particle content, as well as to determine the degree of gaseous emissions emanating from the manufacturing operation. Should the deleterious matter in the air rise above acceptable levels, steps could be taken to remedy the situation before the health of the plant personnel is endangered or conditions become otherwise hazardous.

In the past, air sampling devices generally relied upon motor-operated pumps to draw the ambient air into the device where particles or gas could collect on a filter or in a gas trap in order to be tested. In aluminum reduction plants, however, the magnetic fields generated as a result of the electrical current used in the reduction cells hindered the proper and reliable operation of electrically powered vacuum pumps that were used in collecting air to be sampled. Because a proper analysis of the air sample depends to a large extent upon a constant and repeatable flow rate through the device, the effect of the magnetic fields on the electrically powered vacuum pumps rendered the test results unreliable. Moreover, in large plants the sampling sites are often located at great distances or heights from electrical outlets and thus require extensive lengths of electrical cord to reach the electrically operated sampling device. The set-up of such test facilities is thus rendered more difficult, time-consuming, costly and hazardous.

It is, therefore, a primary object of this invention to provide a device which facilitates obtaining of air samples within an aluminum reduction plant.

More particularly, it is an object of this invention to provide an air sampling device that may be operated without the need for an electrically powered vacuum pump.

Another object of this invention is to provide a portable air sampling device that may be operated at any location within a plant solely by the use of compressed plant air.

A further object of this invention is to provide an air sampling device wherein the passage of compressed air through the device creates a region of reduced pressure as compared with the ambient pressure such that the ambient air is drawn into the sampling device where foreign particles or gases may be trapped in a filter or in a gas trap in order to determine the content of the air.

Briefly, these objects are accomplished by providing an air sampling device having a pipe that is adapted to be connected to any source of compressed air or other gas. A venturi tube is disposed within the pipe such that passage of the compressed air through the pipe will create a region of reduced pressure at the throat of the venturi. Air sampling chambers having membrane filters disposed therein are connected to the throat portion of the venturi such that the reduced pressure therein will draw ambient air into the sampling chambers whereby dust and other foreign particles may be trapped in the filters and thus tested to determine the purity of the air. Alternatively, the air sampling chambers may be provided with a chemical solution trap or similar device whereby gaseous emissions present in the air may be filtered out and qualitatively and quantitatively tested.

With the above and other objects in view that may hereinafter appear, the nature of the invention will be more clearly understood by reference to the several views illustrated in the accompanying drawings, the following detailed description thereof, and the appended claimed subject matter.

IN THE DRAWINGS

Figure 1:
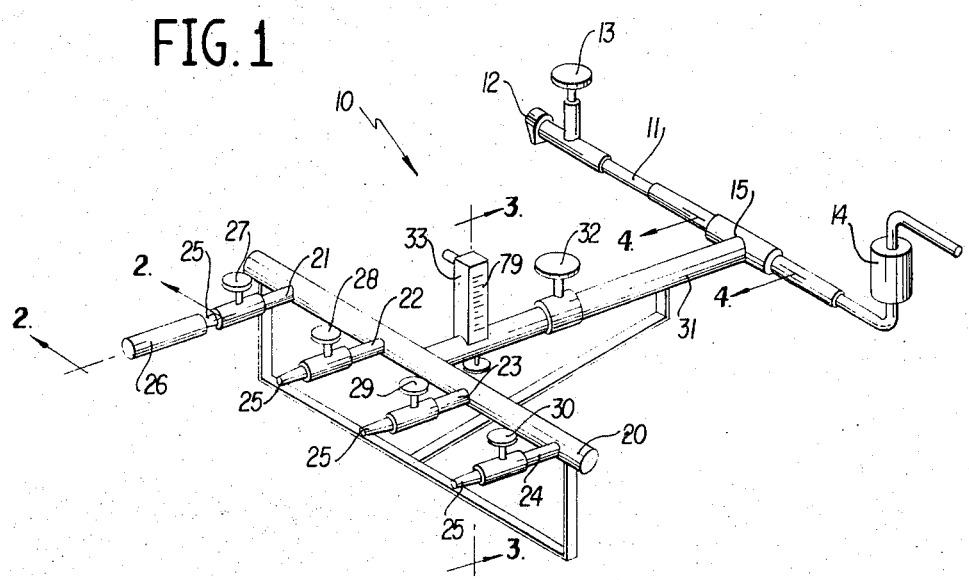
FIG. 1 is a perspective view of an air sampling device constructed in accordance with this invention, and illustrates an air intake manifold having four fittings, with a sample-collecting chamber mounted on one of the fittings.
Figure 3:
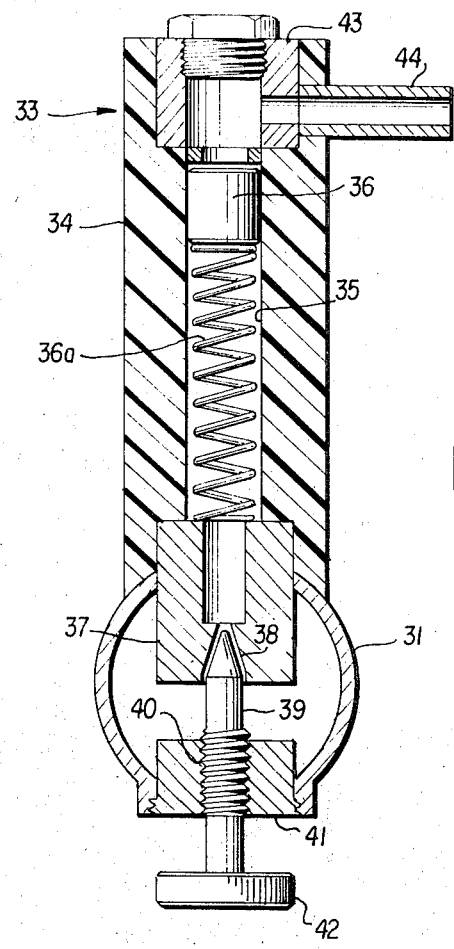
Figure 4:
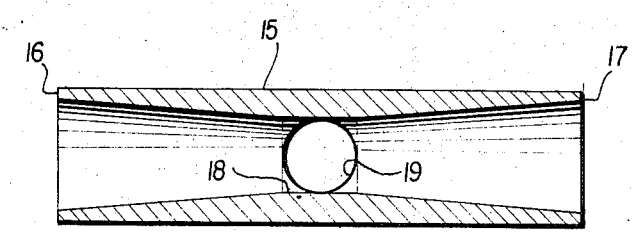

FIG. 3 is an enlarged vertical sectional view taken along line 3—3 of FIG. 1, and illustrates details of a flow meter and calibrating valve whereby the flow rate of the ambient air through the sampling device may be determined; and FIG. 4 is an enlarged sectional view taken along line 4—4 of FIG. 1, and illustrates the venturi tube and the opening into the throat portion thereof by means of which the sample-collecting chambers are connected to the region of reduced pressure.

Referring now to the drawings in detail, there is illustrated in FIG. 1 an air sampling device generally indicated by the numeral 10. The sampling device 10 includes a pipe 11 having a quick disconnect fitting 12 attached to one end thereof whereby the pipe 11 may be connected to a source of compressed gas, typically a hose providing compressed air generally available throughout most plants. A hand valve 13 is provided for controlling the flow of compressed air through the pipe 11. A conventional sound muffler 14 is attached to the end of the pipe 11 for reducing the level of noise produced by the compressed air being emitted therefrom.

A venturi tube 15 having end portions 16, 17 (FIG. 4) and an intermediate throat portion 18 is disposed within the pipe 11 and essentially forms a continuation of the interior passage thereof. The interior wall of the venturi tube 15 is, of course, tapered in from each of the ends 16, 17 towards the throat portion 18. A radial port 19 formed in the wall of the venturi tube 15 communicates with the throat portion 18 for a purpose to be hereinafter explained.

The sampling device 10 also includes an intake manifold pipe 20 having radial branch inlet pipes 21, 22, 23 and 24 extending therefrom. A tapered screw-threaded fitting 25 extends from each of the inlet pipes 21–24 upon which can be mounted an air sampling chamber 26. Valve means 27, 28, 29 and 30 are associated with each of the inlet pipes 21, 22, 23 and 24, respectively, whereby flow may be selectively controlled through any one or all of the inlet pipes 21–24.

The manifold pipe 20 communicates with the interior of the pipe 11 by means of a pipe 31 which is connected to the venturi tube 15 and opens into the throat portion 18 thereof through the port 19. In this manner, each of the air sampling chambers 26 (only one of which is illustrated in FIG. 1) may be communicated with the interior of the pipe 11, and specifically with the throat portion 18 of the venturi tube 15. A valve 32 is provided in the pipe 31 to control the rate of flow of air therethrough. A flow meter 33 is also provided for monitoring the rate of flow through the pipe 31.

As seen most clearly in FIG. 3, the flow meter 33 comprises a housing 34 formed from a transparent plastic material and having gage indicia 79 etched in one face thereof. The housing 34 includes a vertical bore 35 in which is slidingly received a cylinder 36 of calibrated weight which is supported by a coil spring 36a having a calibrated spring constant. A metal fitting 37 molded in the lower portion of the housing 34 provides an abutment for the spring 36a as well as a seat 38 for a needle valve 39. The needle valve 39 includes a screw-threaded portion 40 by means of which it is adjustable relative to and mounted in a block 41 carried by the pipe 31. A hand-wheel 42 permits the needle valve 39 to be adjusted relative to its seat 38 thereby providing for calibration of the flow meter 33. A metal fitting 43 having a pipe 44 extending therefrom serves to close the top of the housing 34 as well as to provide an air passage in communication with the bore 35.

As should be readily apparent, when the valve 39 is open, air passing through the pipe 31 will cause a reduced pressure to exist in the region of the valve 39 and consequently a pressure differential across the weighted cylinder 36. The positive atmospheric pressure acting on the top of the cylinder 36 will cause it to move downward in the bore 35 against the force of the spring 36a, the amount of its downward movement being proportional to the rate of flow through the pipe 31. The transparent plastic material of the housing 34 permits an operator to monitor the height of the cylinder 36 and thus the rate of flow of the air passing through the pipe 31. The air passage provided by the pipe 44 allows ambient pressure to exist in the bore 35 above the calibrated cylinder 36.

Figure 2:
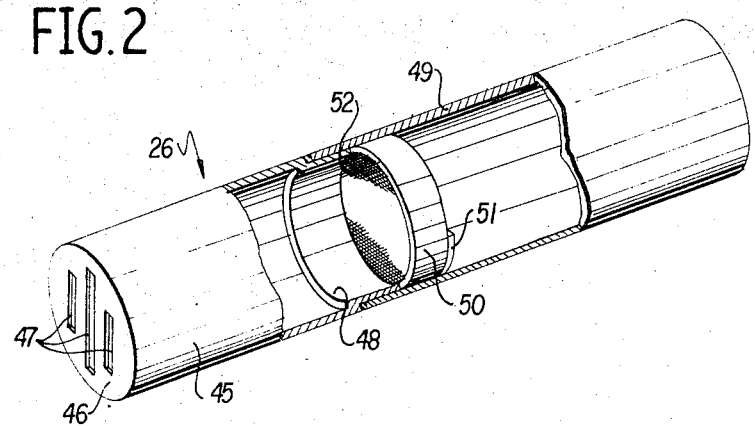
FIG. 2 is an enlarged perspective view of an air-sampling chamber taken partially in section along line 2—2 of FIG. 1, and illustrates details of the filter device and support means.

Referring now to FIG. 2, there are illustrated details of the air sampling chamber 26. The chamber 26 includes a cylindrical cap 45 having an end wall 46 with elongated openings 47 formed therein. The other end of the cap 45 defines a stepped flange 48 which telescopes into a sleeve 49. A filter cartridge 50 is mounted in the sleeve 49 and securely retained between the end of the flange 48 and a perforated retaining plate 51, carried by the sleeve 49. A conventional membrane filter 52 is received in the filter cartridge 50. The cartridge 50 may be removed and replaced in the chamber 26 by simply separating the cap 45 from the sleeve 49. Suitable screw thread means (not shown) may be provided in the end of the sleeve 49 for mounting the air sampling chamber 26 on any one of the fittings 25.

In the event that it is desired to sample the air in order to test for gaseous emissions therein, the filter cartridge 50 may be replaced by a conventional chemical solution gas trap as is well known in the art, or by any similar device capable of trapping gas. The so-called wet trap, of course, would require a drying agent to remove the liquid from the filtered air.

The operation of the air sampling device 10 should be readily apparent in view of the foregoing description. When compressed gas is passed through the pipe 11, the pressure at the throat 18 of the venturi tube 15 will be reduced as compared with the ambient pressure. Consequently, inasmuch as the interiors of any air sampling chambers 26 mounted on the fittings 25 communicate with the throat 18 through the pipe 31, air will be drawn into the chamber 26 and any foreign particles or gases will be trapped in the filter 52 or in any suitable wet gas trap. The manifold pipe 20 and its associated branch inlet pipes 21–24 permit a plurality of air samples to be taken either independently or cooperatively by control of the valve means 27–30.

As the ambient air is drawn through the pipe 31, the rate of flow is monitored by reference to the flow meter 33 and the flow is maintained at a constant rate by manipulation of the valve 32. In order to compare the amount of contaminants in the air at one location with the amount at another location, or to compare the purity of the air at the same location at different times, it is necessary that the size of the samples tested be equal. A sample of air, therefore, is determined by passing air through the filter 52 at a constant rate for a given period of time. Knowing the total volume of air passed through the sampling device 10 and the amount of contaminants removed from such volume, i.e., the amount of contaminant contained in such volume and deposited on the filter 52, concentration of contaminants per unit volume of air at the test site is known.

In view of the foregoing, it should be readily apparent that there is provided in accordance with this invention a novel air sampling device that may be operated without the need for an electrically powered vacuum pump, and is thus particularly useful in aluminum reduction plants where magnetic fields hinder reliable operation of electric motors and pumps. With the use of compressed plant air and the venturi-tube-generated suction of this invention, air samples may be collected more quickly and with more dependability than with prior art type sampling devices. Moreover, the capacity of the air sampling device of this invention is approximately four times as great as the capacity of the prior art lightweight portable electrically operated pumps.

Although only a preferred embodiment of the invention has been specifically illustrated and described herein, it is to be understood that minor variations may be made without departing from the spirit of the invention.

I claim:

1. A portable air sampling device comprising means defining a passage through said device, means adapted to connect said passage to a source of compressed gas, means defining a region of reduced pressure in said passage as compared with the ambient pressure, at least one sample-collecting chamber having pervious sample-collecting means disposed therein, one side of said sample-collecting means communicating with the ambient air and the other side of said sample-collecting means communicating with said region of reduced pressure, manifold means having a plurality of fittings extending therefrom each of which is adapted to receive a sample-collecting chamber, said manifold means disposed in air flow communication between said other side of said sample-collecting means and said region of reduced pressure, and valve means associated with each of said fittings for providing selective utilization of sample-collecting chambers disposed thereon.

2. A portable air sampling device as defined in claim 1 wherein said fittings extend outwardly of said device so that said sample-collecting chambers may be readily connected and disconnected therefrom.

3. A portable air sampling device as defined in claim 1 wherein said means defining a region of reduced pressure is a venturi tube having two ends of a predetermined diameter and a throat portion of a lesser diameter than said ends, and wherein said sample-collecting means communicate with said region of reduced pressure through a pipe which opens into said venturi tube at said throat portion thereof.

4. An air sampling device as defined in claim 1 wherein said sample-collecting means comprises a membrane filter disposed in said at least one sample-collecting chamber for trapping particles carried in the ambient air.

5. An air sampling device as defined in claim 1 wherein said sample-collecting means comprises a chemical solution trap disposed in said at least one sample-collecting chamber for trapping gaseous emissions carried in the ambient air.

6. An air sampling device as defined in claim 1 including a flow meter and valve whereby the rate of flow of ambient air through said device may be measured and controlled.

7. A portable air sampling device as defined in claim 1 wherein said passage includes an inlet end and an exhaust end, and including sound muffling means disposed at the exhaust end of said passage.

* * * * *